(12) United States Patent
Powell et al.

(10) Patent No.: US 6,211,424 B1
(45) Date of Patent: Apr. 3, 2001

(54) ADVANCED VITRIFICATION SYSTEM

(75) Inventors: James R. Powell, Shoreham; Morris Reich, Kew Gardens Hills, both of NY (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 0 days.

(21) Appl. No.: 09/350,194

(22) Filed: Jul. 9, 1999

Related U.S. Application Data

(60) Provisional application No. 60/094,593, filed on Jul. 30, 1998.

(51) Int. Cl.[7] ............................... G21F 9/00; G21F 9/04; G21F 9/06; G21F 9/16
(52) U.S. Cl. ................................. 588/1; 588/2; 588/10; 588/11; 588/16; 588/20; 588/252; 422/129; 422/159
(58) Field of Search ..................... 588/11, 252, 16, 588/1, 2, 10, 20; 422/159, 186.04, 129; 219/660; 976/DIG. 385

(56) References Cited

U.S. PATENT DOCUMENTS

| | | | | |
|---|---|---|---|---|
| 4,943,395 | * | 7/1990 | Sasaki et al. | 252/629 |
| 5,461,185 | * | 10/1995 | Forsberg et al. | 588/11 |
| 5,678,237 | | 10/1997 | Powell et al. . | |

\* cited by examiner

Primary Examiner—Steven P. Griffin
Assistant Examiner—Eileen E. Nave
(74) Attorney, Agent, or Firm—Louis Ventre, Jr.

(57) ABSTRACT

The AVS invention provides for an apparatus and process for its practice involving the vitrification of waste materials, such as nuclear waste, inside a disposable canister. The preferred embodiment of the process includes a canister having outer and inner containers with thermal insulation therebetween. Solid frit sections are placed inside the inner container to create one or more regions for receiving waste. The waste is then loaded into the regions. The inner canister is heated to melt the frit and waste and mix them once molten. The melted mixture is then cooled to form a vitrified product in the module. In an alternative process, chunks of frit are mixed with waste and loaded into the empty canister. The mixture is then melted and cooled inside the disposal canister.

16 Claims, 5 Drawing Sheets

ADVANCED VITRIFICATION SYSTEM

This application claims the benefit of U.S. Provisional Application No. 60/094,593 filed on Jul. 30, 1998.

BACKGROUND OF THE INVENTION

The present invention relates generally to hazardous wastes, and, more specifically, to vitrification thereof for long term storage.

The disclosure of U.S. Pat. No. 5,678,237, which provides a method of in-situ vitrification of waste materials in a disposable canister, is incorporated herein by reference. The disposable canister is a module comprising an inner container, an outer container, and insulation therebetween. The outer container serves as the traditional disposal container typically made of steel, which is thermally insulated from an inner container, typically of made of graphite. The inner container serves as a crucible to melt a waste/frit mixture and contain a molten vitrified product.

In the prior patent, concentrated high-level radioactive waste and frit material are added to the inner container, either pre-mixed in a water slurry and added to the inner container, or one at a time with the frit material added first and the slurry of waste added last. The frit material in the traditional process is a granulated, that is, it is in the form of granules, not a solid section of material. Use of a solid section of frit material in a disposable canister and use of chunks of frit is the invention. Use of a solid frit section or solid frit chunks has process benefits in maximizing the fill fraction of solid glass product inside the canister, shortening the required melt period, controlling glass quality, and controlling the time and temperature profile of the process. In variations of the invention, the solid frit section is continuous across the full width of the module, enabling heat to flow unimpeded through the solid glass from the graphite into the interior of the canister.

Accordingly, it is desired to provide an Advanced Vitrification System (AVS) to practice an improved method for modularly processing and vitrifying waste materials, such as nuclear waste, in a disposable canister. A combination and method involving the use of solid frit sections and chunks of frit inside a module is the innovation sought to be protected.

BRIEF SUMMARY OF THE INVENTION

A device for waste vitrification in the final disposal container, and process for using the device. The device includes a canister containing solid frit sections. The solid frit sections create one or more regions in the canister for receiving waste. In the process, waste is added to the regions in the canister. In an alternative process, chunks of frit are combined with waste and added to the canister. The canister is then heated to melt the frit and waste. The melted mixture is then cooled to form a vitrified product in the module.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
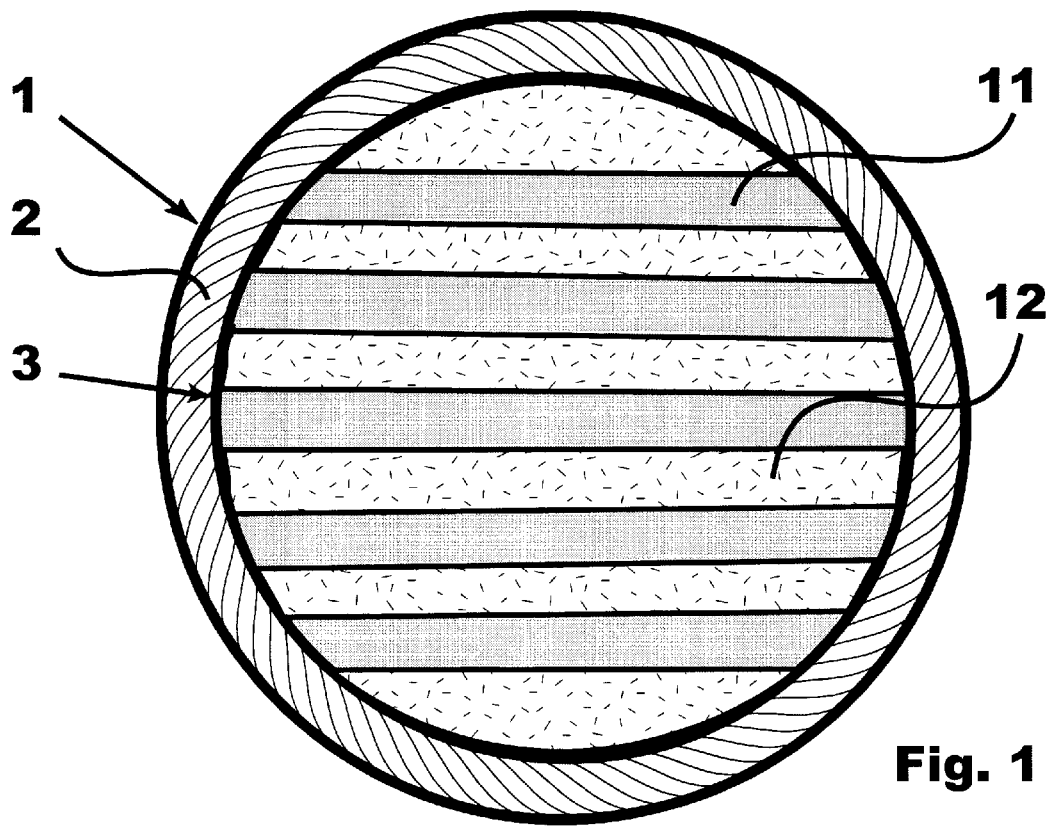
FIG. 1 illustrates the use of solid frit vertical plates in a disposal canister.

The AVS invention provides new and useful art relating to the processing or concentrating of wastes within the disposal canister. In the preferred embodiment the canister is a module having an inner and an outer container with insulation therebetween. The AVS invention significantly improves the apparatus and the methodology for vitrification of wastes within a disposal canister. In particular, the AVS invention provides for the use of solid frit sections or chunks of frit instead of granulated frit mixed with the waste particles.

The traditional approach of using granulated frit mixed with waste has several disadvantages for waste vitrification in a disposal canister. Using a granular bed of mixed frit material and waste can result in a low fill fraction of solid glass product inside the canister. Volume reduction from melting can leave a final glass product occupying less than 60% of the container volume. Using a granular bed of mixed frit material and waste requires a relatively long melt time due to the low thermal conductivity of the mixture. This in turn results in a high energy for maintaining the melt temperatures during the longer processing times. From a practical standpoint, the use of a granular bed of mixed frit material and waste requires an extra process steps to obtain a uniform mixture.

Use of a solid section of frit material or chunks of frit in a disposable canister helps to solve three outstanding technical issues associated with a device for vitrification in a disposable canister. These are: improving the quality of glass product, maximizing the glass fill fraction in the canister, and maximizing heat transfer rate from heated graphite crucible into the canister interior. Use of a solid frit section or chunks of frit also has process benefits in maximizing the fill fraction of solid glass product inside the canister, shortening the required melt period, controlling glass quality, and controlling the time and temperature profile of the process.

Maintaining a high glass fill fraction is important with regard to the necessary shielding weight and transport capability of the transport units that carry the processed canisters to their final disposal site. A high fill fraction, e.g. greater than 80 percent, can also be an important parameter if there are restrictions on the size and number of disposal canisters that the final repository will accept.

For conventional high temperature melters, the canister contains about 25 percent waste by volume of total vitrified product. A vitrified product with a higher percentage of waste is possible if higher melt temperatures are used. Achieving much higher percentages of waste in a conventional melter is probably not possible since the necessary melt temperature is several hundred degrees Centigrade hotter than the about 1100 degrees Centigrade needed for a 25 percent loading. Such temperatures are too great for the required reliability on the melter. The use of solid frit sections or chunks of frit reduces the time to melt the mixture by a factor of as much as ten compared to a conventional pot melter. This shorter processing time permits greater control of the time/temperature profile of the mixture and shorter exposure of the canister to the high melt temperatures enhances the potential to achieve high waste loadings.

AVS canisters can be filled to a greater fraction of waste than molten glass pour canisters. Since one is loading solid wastes in a controlled manner, the pre-loaded frit sections can be loaded virtually to the top of the canister. Pre-loading solid frit sections into the canister would eliminate the traditional pre-mix process step involving granulated frit and waste material.

A granulated random mixture of waste and frit particles in a canister will have a solid fraction of about 63%. Grading mixtures of smaller and larger particles can increase the solid fraction to a range of 75% to 85%. In contrast, solid frit sections deliver a high galue oof solid fraction of materrials in the canister, on the order of 90%. This is possible because solid frit sections have 100% density compared to about 65% density for a bed of granular particles, and the volume ratio of solid frit to waste particles is high, typically about 3/1.

Thus AVS canisters can actually hold more radioactive waste than conventional pour type canisters of the same outer dimensions. An AVS canister could thus hold 50% more waste than a conventional canister of the same outer dimensions, assuming 1) that the AVS canister can be loaded with 45% waste oxides as a result of its higher temperature capability as compared to the 25% oxide loading capability of conventional large central melters, 2) solid frit sections are used, and 3) the thickness of the thermal insulation and the graphite crucible is about 1 inch.

A variety of configurations illustrated by the drawings can be used with chunks of frit or solid frit sections. In all embodiments employing solid frit sections, the method of using the invention starts with loading the solid frit sections into the inner container. Then the waste would be loaded. Then the melting process would take place. And, finally, the vitrified product would be cooled. In the embodiment employing solid frit chunks, the method of using the invention mixes the chunks of frit with waste. Then the waste and frit would be loaded. Then the melting process would take place. And, finally, the vitrified product would be cooled.

FIG. 1 shows a top view of an AVS canister having an outer container (1), an inner container (3) and insulation therebetween (2). Glass solid frit sections in the form of vertical plates (11) are evenly spaced within the inner container. The plates extend to the walls of the inner container and lengthwise to about the top and bottom of the inner container. Waste can be added to the regions (12) between the plates.

Figure 2:
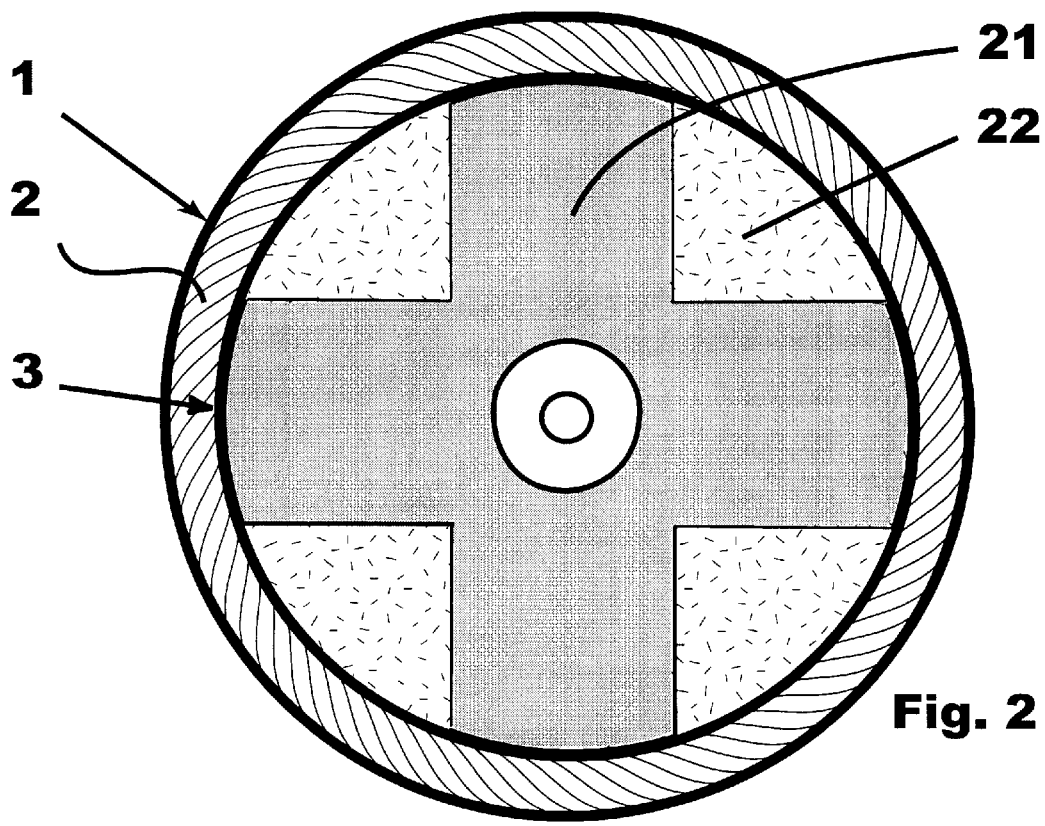
FIG. 2 illustrates the use of a cross-shaped solid frit section in a disposal canister.

FIG. 2 shows a top view of an AVS canister having an outer container (1), an inner container (3) and insulation therebetween (2). A glass solid frit section in the form of a cross (21) is concentrically located within the inner container. The cross-shaped section extends to the walls of the inner container and lengthwise to about the top and bottom of the inner container. Waste can be added to the pie-wedge regions (22) between the cross-shaped section.

Figure 3:
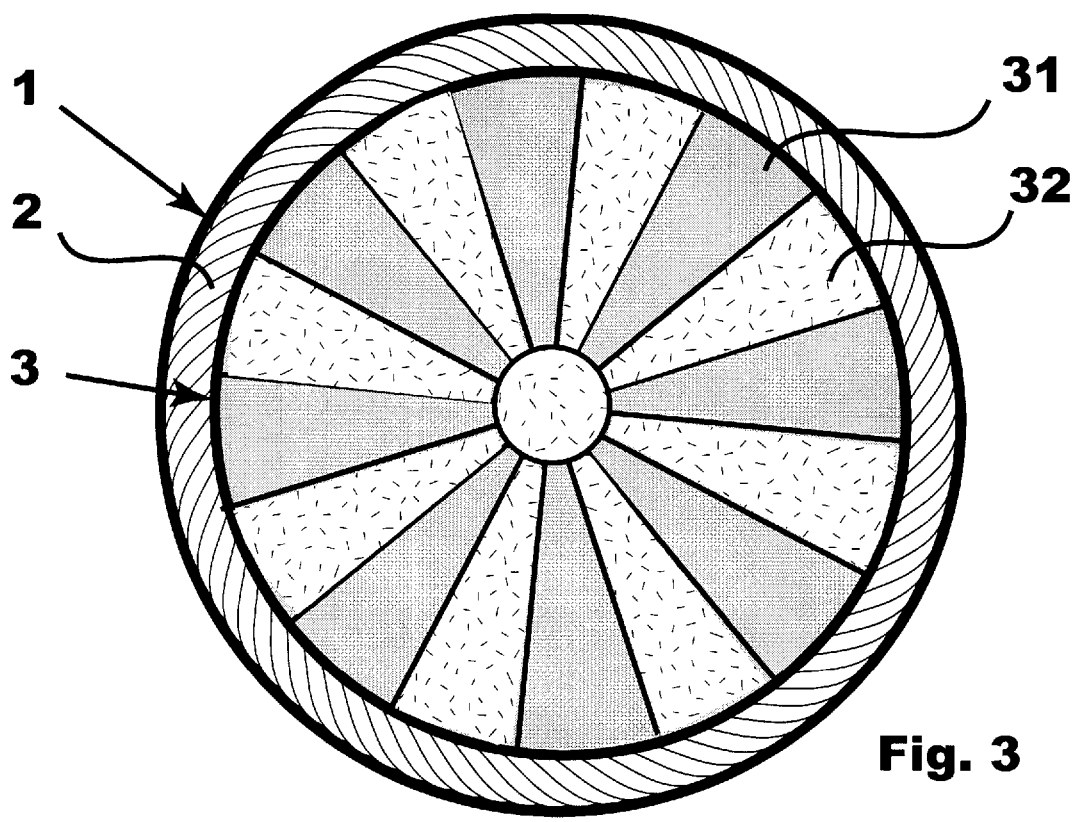
FIG. 3 illustrates the use of a star-shaped solid frit section in a disposal canister.

FIG. 3 shows a top view of an AVS canister having an outer container (1), an inner container (3) and insulation therebetween (2). A glass solid frit section in the form of a star (or individual solid frit plates (31) forming a star shape) is concentrically located within the inner container. The star-shaped section extends to the walls of the inner container and lengthwise to about the top and bottom of the inner container. Waste can be added to the regions (32) between the arms of the star.

Figure 4:
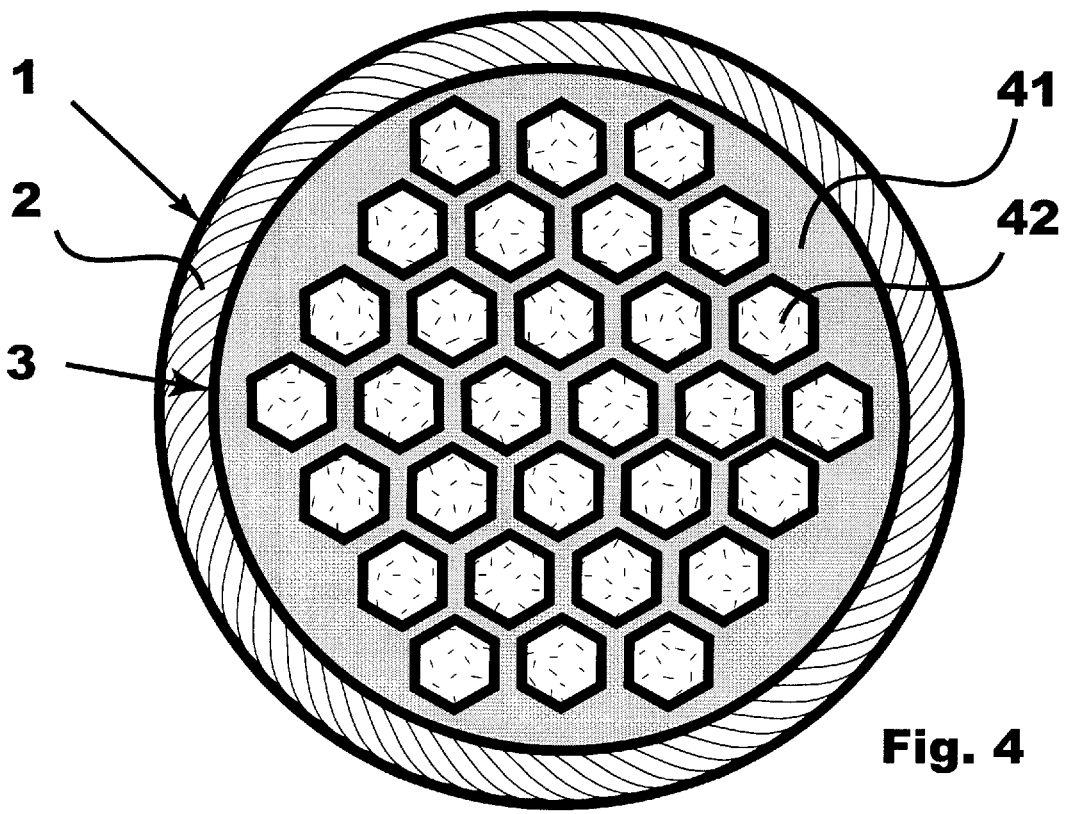
FIG. 4 illustrates the use of a honey-combed solid frit section in a disposal canister.

FIG. 4 shows a top view of an AVS canister having an outer container (1), an inner container (3) and insulation therebetween (2). A glass solid frit section (41) having holes (42) throughout forming a honey-comb configuration is concentrically located within the inner container. The honey-comb shaped section extends to the walls of the inner container and lengthwise to about the top and bottom of the inner container. Waste can be added to the regions or holes (42) in the solid frit section.

Figure 5:
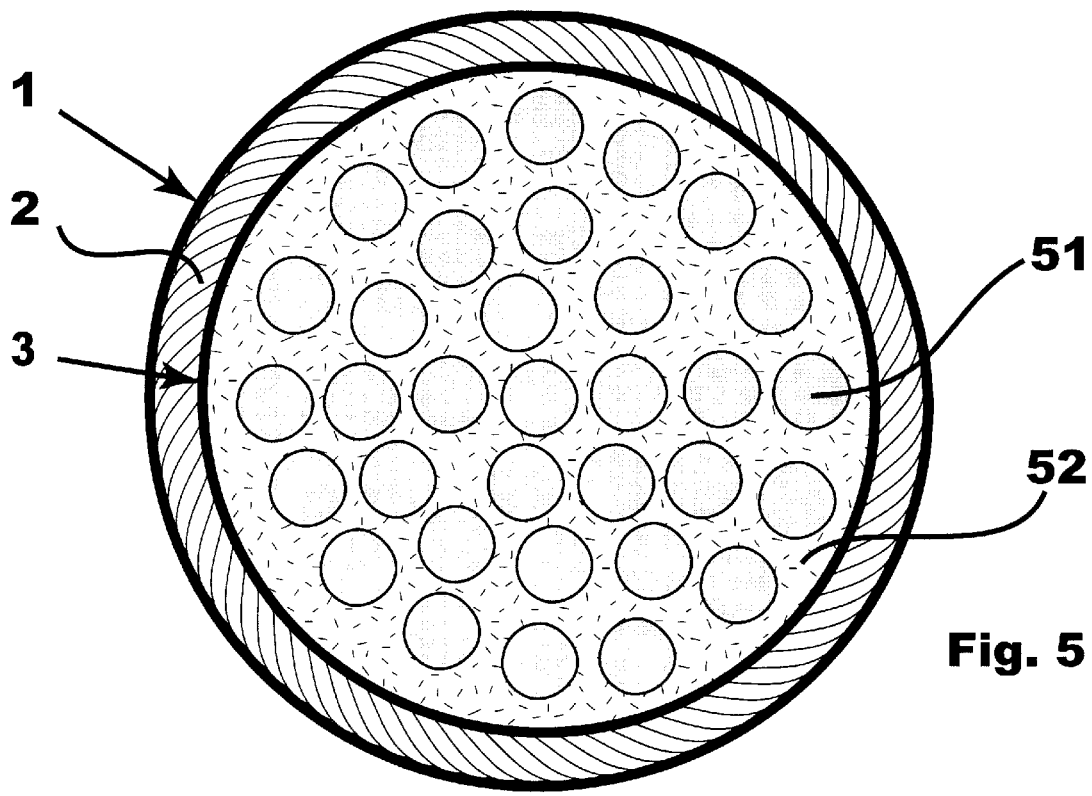
FIG. 5 illustrates the use of solid frit rods in a disposal canister.

FIG. 5 shows a top view of an AVS canister having an outer container (1), an inner container (3) and insulation therebetween (2). A glass solid frit section having solid frit rods (51) is located within the inner container. The rods are more or less evenly distributed throughout the cross-section and extend lengthwise to about the top and bottom of the inner container. Waste can be added to the regions (52) between the rods.

Figure 6:
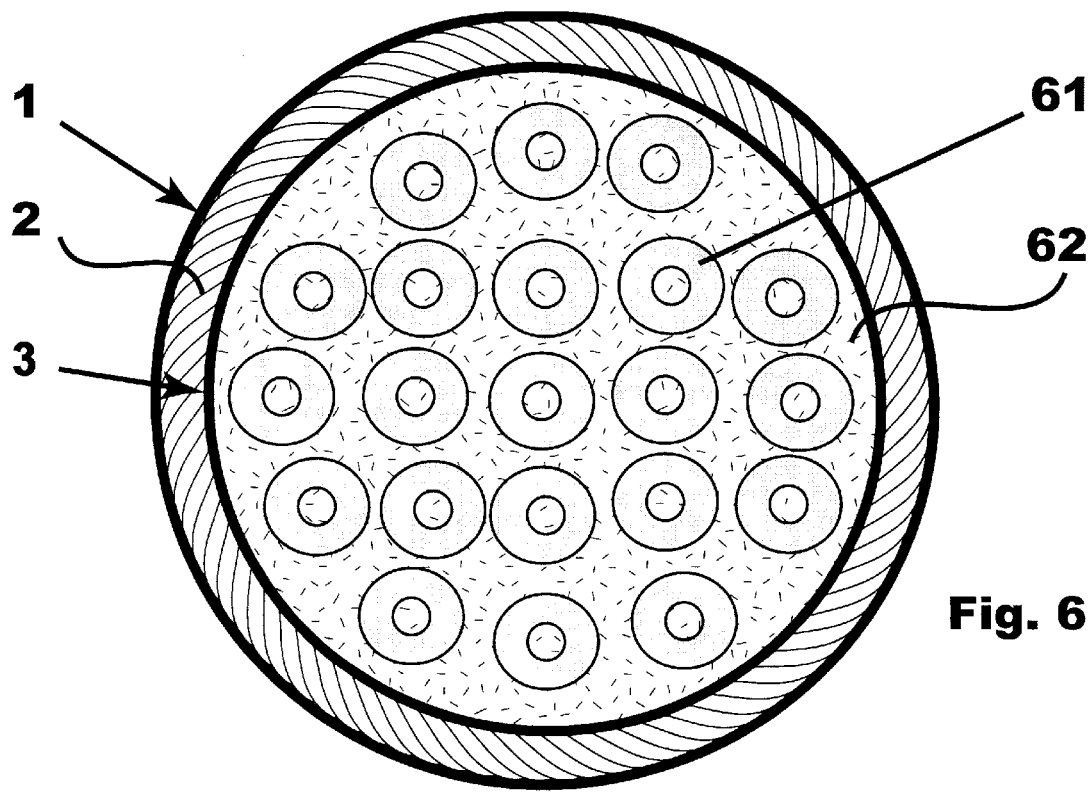
FIG. 6 illustrates the use of solid frit tubes in a disposal canister.

FIG. 6 shows a top view of an AVS canister having an outer container (1), an inner container (3) and insulation therebetween (2). A glass solid frit section consisting of tubes of solid frit (61) are located within the inner container. The tubes are more or less evenly distributed throughout the cross-section and extend lengthwise to about the top and bottom of the inner container. Waste can be added to the regions (62) between the rods and in holes in the tube-shaped solid frit.

Figure 7:
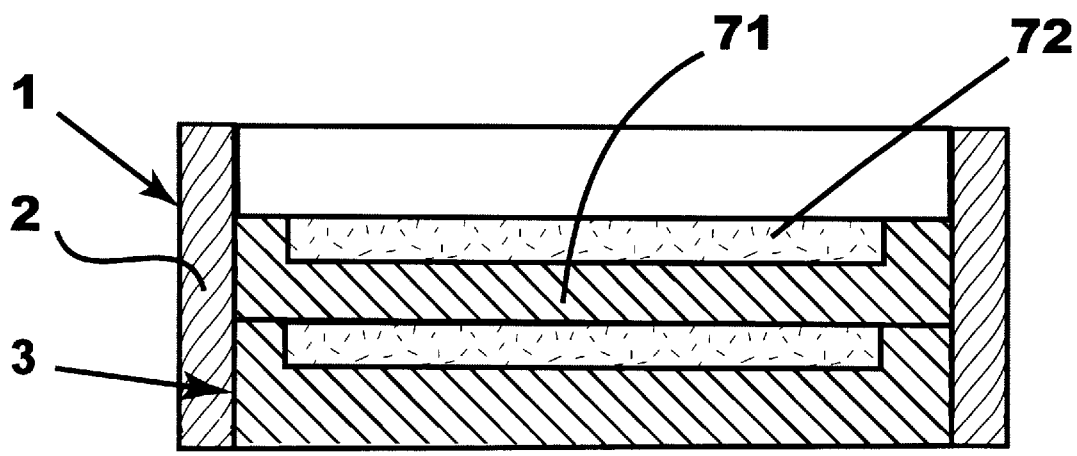
FIG. 7 illustrates the use of solid frit dishes in a disposal canister.

FIG. 7 shows a side view section of an AVS canister having an outer container (1), an inner container (3) and insulation therebetween (2). Glass solid frit sections consisting of plates or dishes of solid frit (71) are located within the inner container. The plates are stacked from the bottom to the top of the inner container and extend almost to the walls of the inner container. Waste particles (72) are added to the regions created by the dish shapes.

Figure 8:
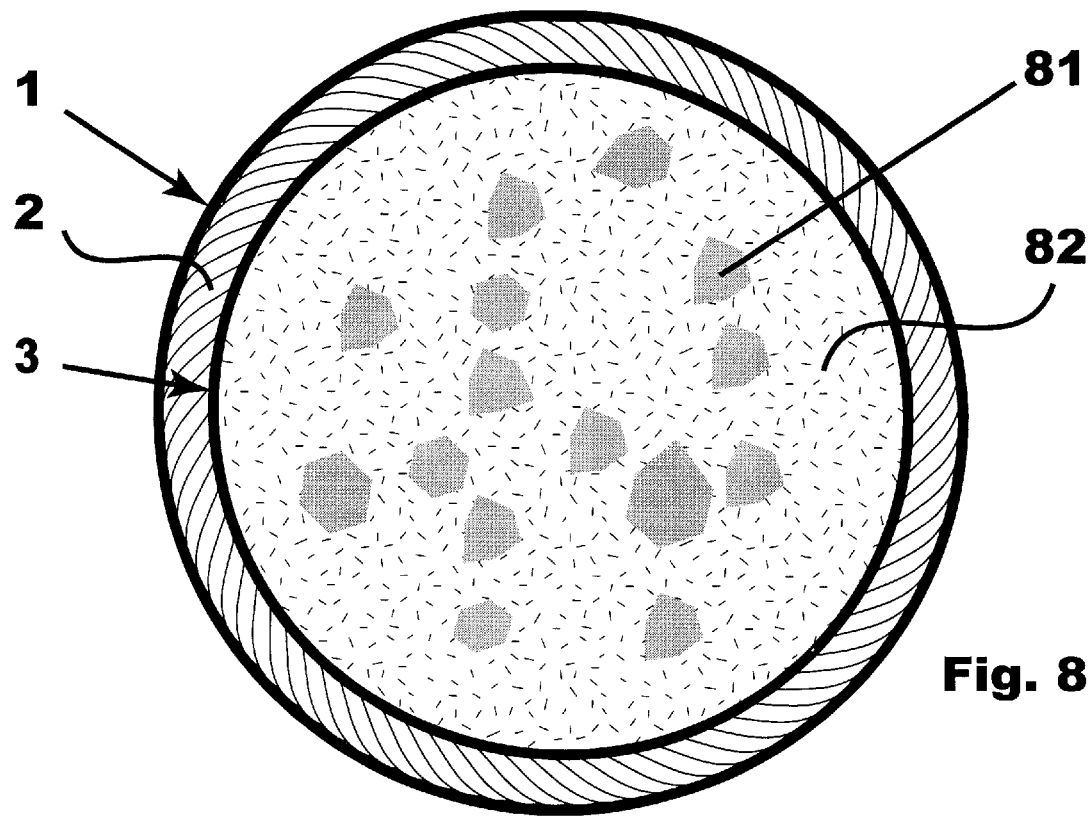
FIG. 8 illustrates the use of solid frit chunks in a disposal canister.

FIG. 8 shows a vertical cross-section of an AVS canister having an outer container (1), an inner container (3) and insulation therebetween (2). Chunks of frit (81) are mixed with the waste (82) and loaded into the inner container. The chunks of frit are much larger than the traditional granular frit.

Figure 9:
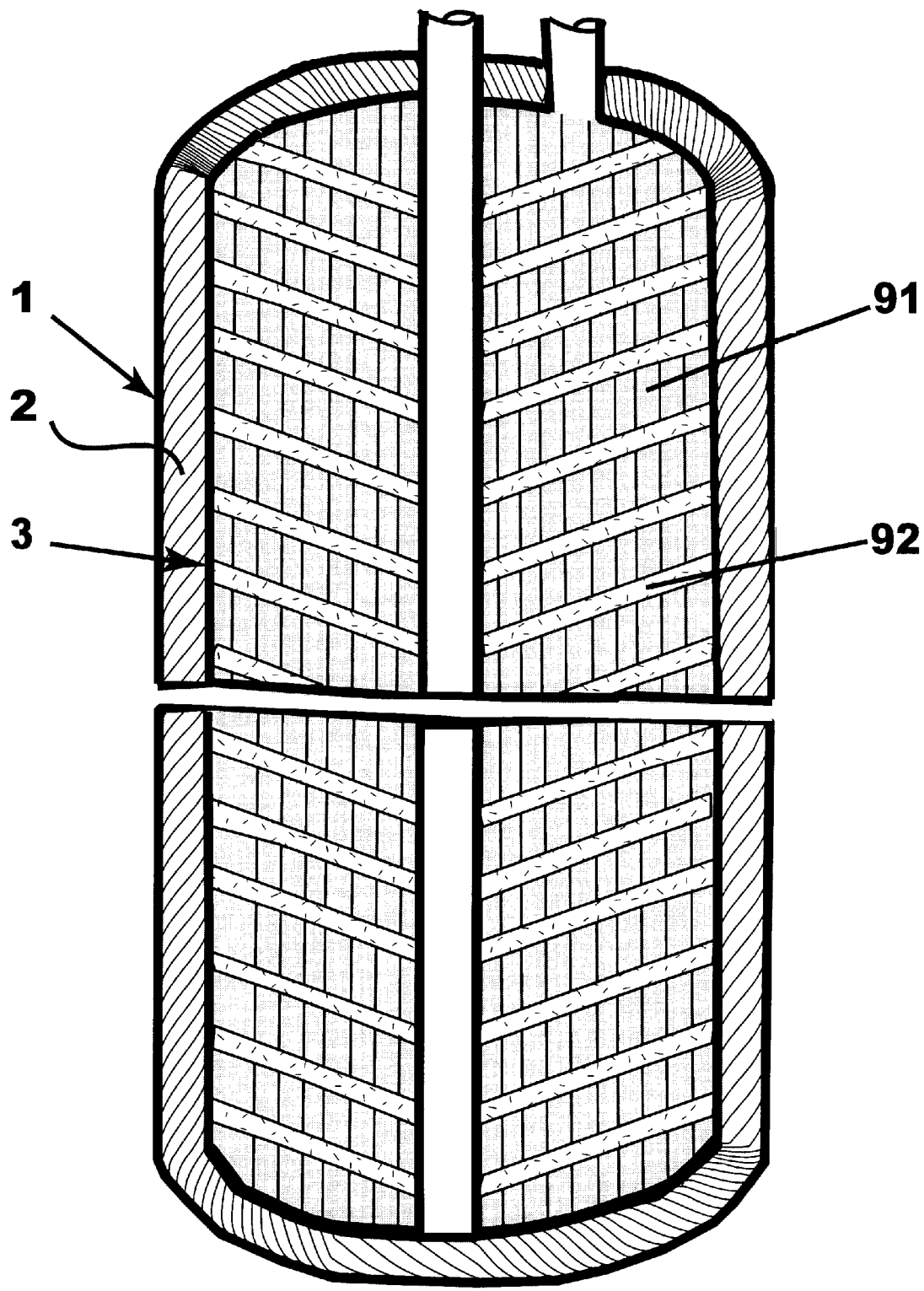
FIG. 9 illustrates the use of angled horizontal plates in a disposal canister.

FIG. 9 shows a vertical cross-section of an AVS canister having an outer container (1), an inner container (3) and insulation therebetween (2). Glass solid frit sections (91) having an angled horizontal plate arrangement wherein the plates slope down to the center of the inner container. Waste particles (92) are added to the regions between the plates.

In all variations of the invention, glass solid frit chunks or sections permit in-canister vitrification to substantially increase the product glass fill fraction in the canister and greatly increase the rate of heat transfer into the canister, i.e., by a factor of about 10, because the thermal conductivity of the solid glass is an order of magnitude greater than that of a bed of granular particles.

The use of solid glass chunks or sections enables heat to flow unimpeded through the solid glass from the inner container, typically made of graphite, into the interior of the canister to reach the regions containing waste. In the honeycomb frit embodiment of the invention, the space between the plates and the honeycomb cell is small compared to the diameter of the graphite crucible, so that the thermal resistance of the waste particle is also small.

The much faster rate of heat transfer results in a much shorter time to heat up and melt the waste/frit contents of the canister. For a typical canister that is an order of 60 centimeters in diameter, it takes about 24 hours to dry and melt the contents if they are present as a bed of granulated particles. In contrast, with solid frit sections the total time to dry and melt the contents can be reduced to a few hours.

The frit material has several embodiments. In all embodiments, the frit material is such that the chemical composition of each batch can be selected to modify disparate chemical compositions of waste, improve filtration and yield the desired final chemical composition of a product glass. Of all possible combinations solid frit sections or chunks of frit will have the best results.

In another embodiment of the invention, the frit material has the desired filtration and chemistry by mixing a variable form of solid, full density sections, beads and granules.

In another filtering embodiment, the filter/frit material is composed of solid sections through which a waste slurry must traverse to leave the inner container. The solid sections have a small pore surface filter over a large pore frit material, which is over a solid chunk of frit material having internal flow passages. The internal flow passages facilitate filtering and permit the flow of the slurry to the exit tube.

In a variation of the filtering embodiment, the solid sections have a porous surface filtration layer of progressively finer porosity over a solid section having internal flow passages. The variable porosity is obtained from an external layer on the solid section of wound glass fibers, foamed glass, or a glass filter paper or some combination thereof.

EXAMPLE 1

This example illustrates the preferred embodiment of the Advanced Vitrification System used for the concentration and vitrification of high-level radioactive wastes.

A device which includes an outer container, an inner container, thermal insulation between the inner and outer containers, and solid frit sections within the inner container which form one or more regions in said inner container for receiving waste. In the process, waste is added to the regions. Then the waste and frit are heated, preferably by induction, to form a melt mixture. Then the mixture is cooled providing a vitrified product.

EXAMPLE 2

In an alternative embodiment, the device includes an outer container, an inner container, thermal insulation between the inner and outer containers. In the process, waste and chunks of frit are mixed together. Then the waste and frit are added to the container. Then the waste and frit are heated, preferably by induction, to form a melt mixture. Then the mixture is cooled providing a vitrified product.

While there have been described herein what are considered to be preferred and exemplary embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A module for vitrification of waste comprising:
   a disposable canister; and,
   frit loaded inside the canister wherein the frit is in the form of one or more solid sections creating one or more regions in the canister for receiving waste, wherein each section is continuous to the approximate width or the height of the canister, and wherein the sections have a combined unmelted density in the canister of about 100%.

2. A module according to claim 1 further comprising an inner container disposed inside the canister; and a thermal insulator disposed between the canister and the inner container.

3. A module according to claim 1 wherein said frit comprises a plurality of vertical rectangular plates.

4. A module according to claim 1 wherein said frit has a cross-shaped cross section.

5. A module according to claim 1 wherein said frit has a honeycomb cross section.

6. A module according claim 1 wherein said frit comprises a plurality of angled horizontal plates.

7. A module according to claim 1 wherein said frit has a star-plate cross section.

8. A module according to claim 1 wherein said frit comprises a plurality of cylindrical rods.

9. A module according to claim 1 wherein said frit comprises a plurality of hollow cylindrical rods.

10. A method for vitrifying waste comprising the steps of:
   a. loading frit into a canister wherein the frit is in the form of one or more solid sections creating one or more regions in the canister for receiving waste, wherein each section is continuous to the approximate width or the height of the canister, and wherein the sections have a combined unmelted density in the canister of about 100%;
   b. loading waste into said region or regions;
   c. heating the waste and frit inside the canister until a melted mixture is obtained; and
   d. cooling said melted mixture to form a vitrified product.

11. The method according to claim 10 wherein said canister is a module having an inner container, an outer container and a thermally insulating material between said inner container and outer container.

12. The method according to claim 10 wherein said frit is one or more vertical rectangular plates.

13. The method according to claim 10 wherein said frit has a cross-shaped cross section.

14. The method according to claim 10 wherein said frit has a star-plate cross section.

15. The method according to claim 10 wherein said frit has a honeycomb cross section.

16. The method according to claim 10 wherein said frit has an angled horizontal plate cross section.

* * * * *